United States Patent [19]

Frederiksen

[11] Patent Number: 5,541,804

[45] Date of Patent: Jul. 30, 1996

[54] PTC PROTECTOR FOR AT&T STYLE 110 BLOCK

[75] Inventor: Bjarne Frederiksen, Lombard, Ill.

[73] Assignee: Illinois Tool Works Inc., Glenview, Ill.

[21] Appl. No.: 273,207

[22] Filed: Jul. 11, 1994

[51] Int. Cl.[6] ............................................... H02H 9/04
[52] U.S. Cl. .................. 361/119; 361/58; 361/106; 361/127
[58] Field of Search .................................. 361/106, 119, 361/58, 126, 127

[56] References Cited

U.S. PATENT DOCUMENTS

| | | | |
|---|---|---|---|
| 4,687,270 | 8/1987 | Plyler et al. | 439/350 |
| 4,692,833 | 9/1987 | Chung | 361/119 |
| 4,796,150 | 1/1989 | Dickey et al. | 361/119 |
| 4,846,735 | 7/1989 | Teichler et al. | 439/709 |
| 4,849,846 | 7/1989 | Hung et al. | 361/56 |
| 4,876,621 | 10/1989 | Rust et al. | 361/58 |
| 4,922,374 | 5/1990 | Mueller et al. | 361/119 |
| 4,968,264 | 11/1990 | Ruehl et al. | 439/622 |

*Primary Examiner*—Todd DeBoer
*Attorney, Agent, or Firm*—Schwartz & Weinrieb

[57] ABSTRACT

A current-limiting protector package for use in conjunction with telephone terminal blocks comprises a two-piece interfitting housing which is made up of two housing halves soncially welded together. A pair of tip or ring terminals is disposed within each housing half along with a current-limiting device in the form of a positive-temperature-coefficient (PTC) device of the conductive polymer type. Lower end portions of the tip or ring terminals project outwardly from the housing so as to be capable of electrical engagement with opposed sets of terminals provided upon the telephone terminal block, while upper end portions of the tip or ring terminals project outwardly from the housing so as to be accessible to a line test probe whereby the lines or circuits of the telephone terminal block can be tested in connection with their operative status without necessitating removal of the protector package from the terminal block.

20 Claims, 4 Drawing Sheets

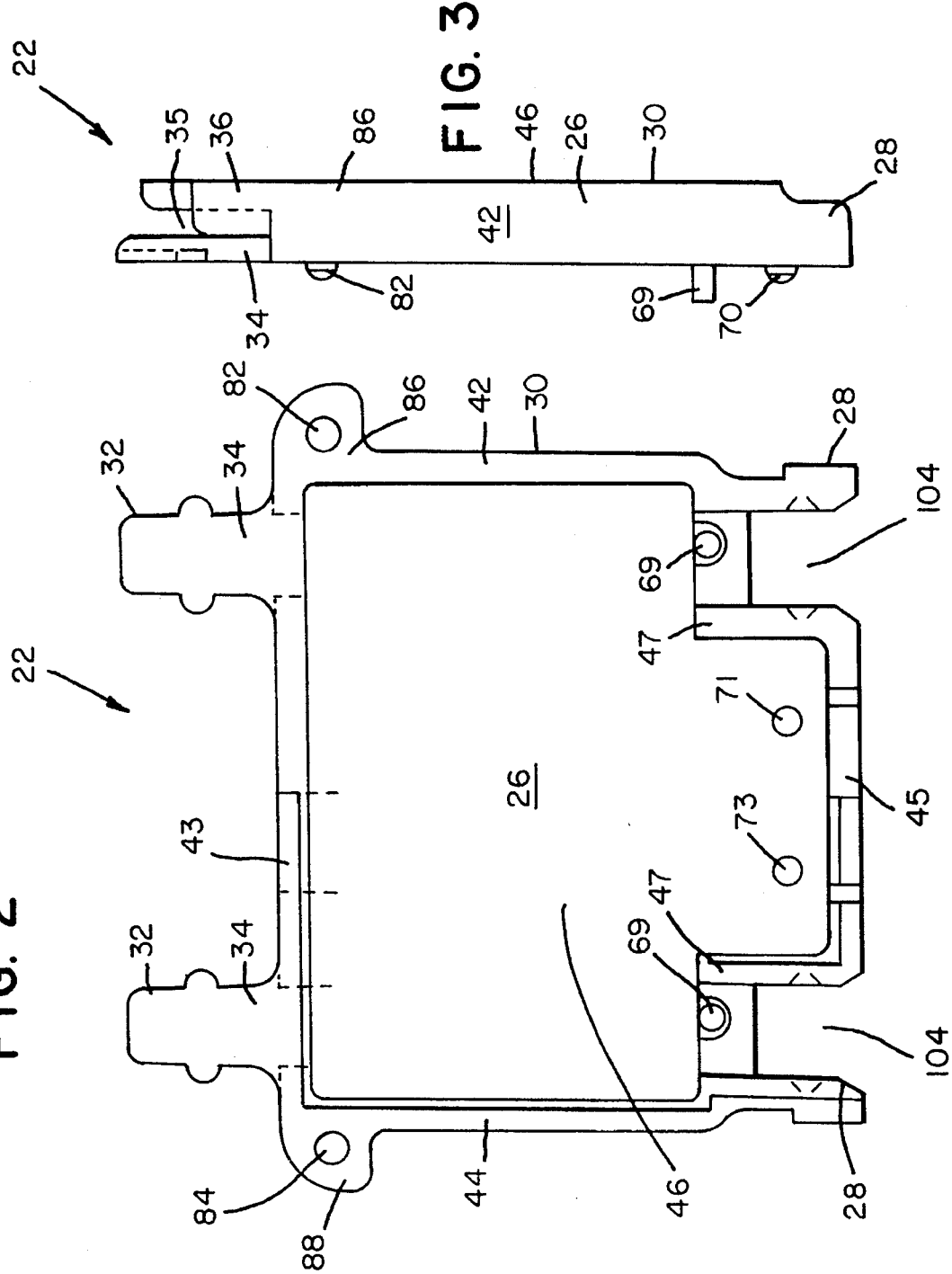

PTC PROTECTOR FOR AT&T STYLE 110 BLOCK

CROSS-REFERENCE TO RELATED PATENT APPLICATIONS

This patent application is related to U.S. Pat. No. 5,341,269 filed July 31, 1992 in the name of Gregory R. Hayward et al. for a VOLTAGE PROTECTOR AND GROUNDING BAR ARRANGEMENT FOR TERMINAL BLOCK, in that some of the structural components of the present invention as embodied within the present patent application are similar to the structural components of the invention embodied within the aforenoted previously filed patent application.

FIELD OF THE INVENTION

The present invention relates generally to surge-current or over-current protector packages, and more particularly to a posi- tive-temperature-coefficient (PTC) surge-current or over-current protector package, which includes a two-piece interfitting housing, tip/ring terminal contacts disposed therein, and a pair of positive-temperature-coefficient (PTC) surge-current or over-current limiting devices connected to the tip/ring terminal contacts and also disposed within the housing, for use in connection with the cross-connection of two rows of terminals of a telephone terminal block conventionally referred to as an-AT&T Style 110 Block.

BACKGROUND OF THE INVENTION

Heretofore, there has been known in the prior art a plug-in fuse carrier which has been operable as a surge-current or over-current protector in connection with the cross-connection of two rows of terminals of a telephone terminal block, conventionally referred to as an AT&T Style 110 Block, which is commonly used within telephone and other electronic applications. Such a fuse carrier is illustrated and described within U.S. Pat. No. 4,968,264 which was issued to William E. Ruehl et al., and is assigned to the same assignee as that of the present patent application. More particularly, such a fuse carrier is adapted to be mounted on the top section of a two-piece interfitting housing which, in turn, is adapted to be mounted upon the aforenoted telephone terminal block in order to cross-connect two rows of terminals of the telephone terminal block as is illustrated within the aforenoted pending patent application Ser. No. 07/923,249.

While the foregoing surge-current or over-current protector has in fact provided the necessary current protection requirements, it has been realized that in conjunction with particular or specific telephone terminal blocks, arrangements, or applications, another type of protector may be preferable. For example, in connection with a particular or specific telephone terminal block, arrangement, or application, when the associated circuits of the block, arrangement or application experience surge-current or over-current conditions wherein the current levels are such as to cause the fuse elements or components of the aforenoted fuse carrier to be blown in order to open and protect the associated circuits of the telephone block, the fuse carriers, having the blown fuses incorporated therein, must necessarily be removed from the aforenoted two-piece inter-fitting housing, disposed of, and replaced by means of new fuse carriers having operative fuse elements or components disposed therein. A need therefore exists for surge-current or over-current protector packages which do not employ disposable fuse carriers, having fuse elements or components disposed therein which are susceptible to failure by being blown out as a result of experiencing an excessive amount of current during current surges or over-current conditions, whereby the need for removing and replacing such fuse carriers, and their associated fuse elements or components, is eliminated. More particularly, a need exists, toward which the present invention is directed, for surge-current or over-current protector packages which provide essentially the same type of surge-current or over-current protection, but in lieu of necessitating removal and replacement, the packages contain or comprise devices which are automatically resettable to their operative states once the surge-current or over-current condition has been eliminated or has abated.

In addition to the foregoing need and operational objectives and characteristics, in order to simplify manufacture of the two-piece housings, minimize manufacturing costs, and to render the various housings compatible with the same terminal blocks, it is further desired to provide similar or standardized housings regardless of whether or not the housings will accommodate replaceable fuse elements or resettable current limiting protection devices, such as, for example, positive-temperature-coefficient (PTC) devices.

OBJECTS OF THE INVENTION

Accordingly, it is an object of the present invention to provide a new and improved surge-current or over-current protector.

Another object of the present invention is to provide a new and improved surge-current or over-current protector which is useable in connection with AT&T Style 110 terminal blocks for cross-connecting two rows of terminals of the telephone terminal block while protecting the circuits associated therewith.

Yet another object of the present invention is to provide a new and improved surge-current or over-current protector which is automatically resettable in response to surge-current or over-current conditions being experienced within the protected circuits.

Still another object of the present invention is to provide a new and improved surge-current or over-current protector which employs automatically resettable positive-temperature-coefficient (PTC) devices.

A further object of the present invention is to provide a new and improved surge-current or over-current protector which is automatically resettable in response to surge-current or over-current conditions experienced within the protected circuits whereby removal and replacement of the surge-current or over-current protection devices is rendered unnecessary.

A yet further object of the present invention is to provide a new and improved surge-current or over-current protector which comprises a two-piece interfitting housing which is substantially the same as conventional or current-design housings employing fuse devices whereby the housings of the present invention protector are substantially the same as those conventional or current-design housings such that manufacture of all of such housings remains substantially uniform or standardized.

SUMMARY OF THE INVENTION

The foregoing and other objects are achieved in accordance with the present invention through the provision of a new and improved surge-current or over-current protector for use in connection with AT&T Style 110 telephone terminal blocks which briefly comprises a two-piece interfitting housing wherein the housing halves are adapted to be sonically welded together. Each housing half houses or contains a pair of tip or ring terminals or contacts and a positive-temperature-coefficient (PTC) over-current or surge-current protection or current-limiting device disposed therein and connected to the pair of tip or ring terminals or contacts respectively disposed within the particular housing half. As is conventionally known, the positive-temperature-coefficient (PTC) protection or current-limiting devices are automatically resettable in response to the elimination or abatement of the surge-current or over-current circuit conditions.

The present invention is further directed toward the provision of a new and improved arrangement or combination of the foregoing protector and the AT&T Style 110 terminal block wherein the lower end portions of the tip or ring terminals or contacts are adapted to be electrically connected to opposed or laterally spaced terminals of the terminal block so as to cross-connect the particular terminals of the terminal block in order to protect the circuits operatively associated therewith.

BRIEF DESCRIPTION OF THE DRAWINGS

Various other objects, features, and attendant advantages of the present invention will be more fully appreciated from the following detailed description, when considered in connection with the accompanying drawings, in which like reference characters designate like or corresponding parts throughout the several views, and wherein:

FIG. 2 is a front elevational view of one half of a housing element of the aforenoted protector package, constructed in accordance with the principles of the present invention, for containing the protector devices and tip or ring terminals or contacts of the protector package of the present invention which is to be used in combination with the telephone terminal block as seen in FIG. 1;

FIG. 3 is a side elevational view of the housing half of FIG. 2;

DETAILED DESCRIPTION OF THE PREFERRED EMBODIMENTS

Figure 1:
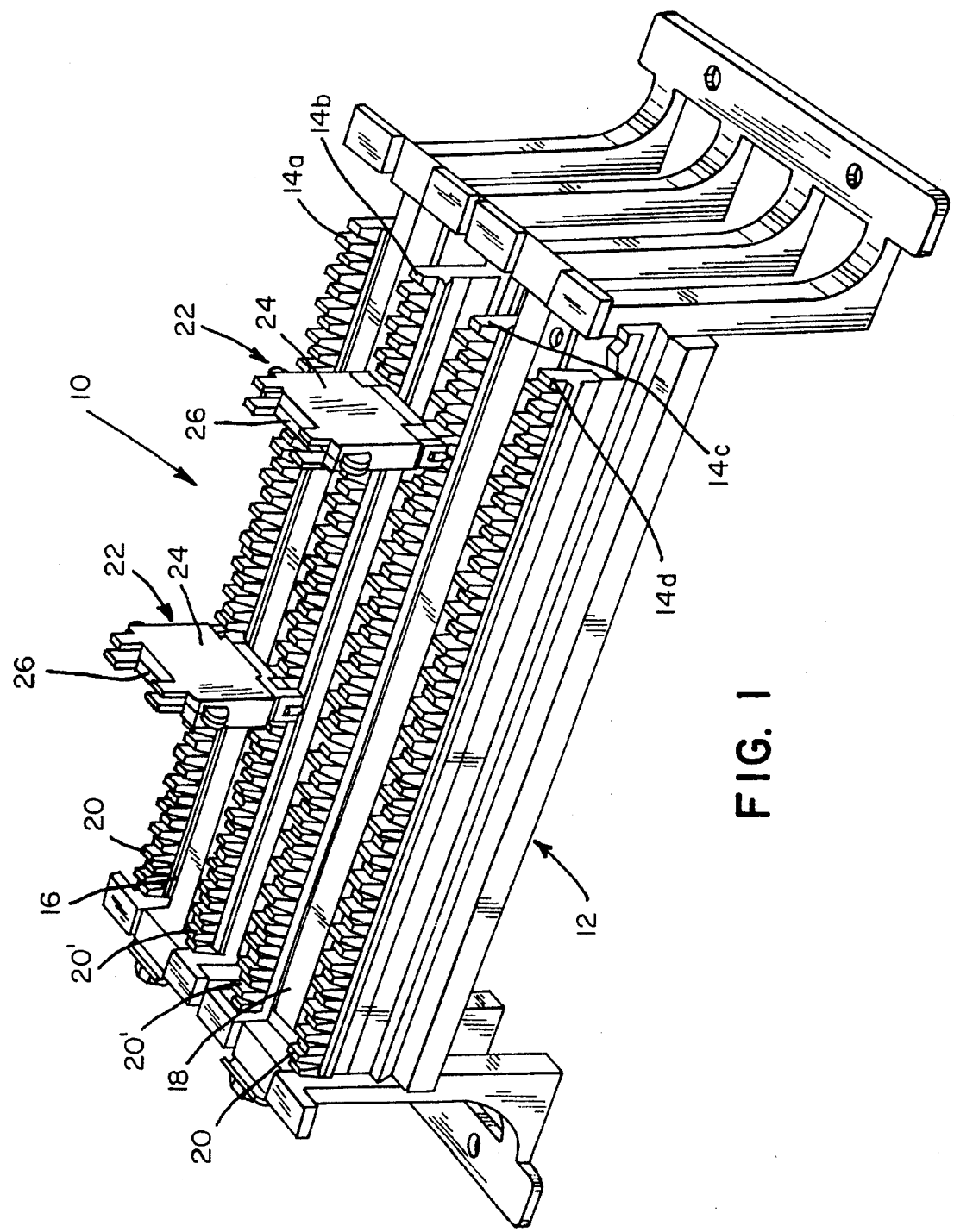
FIG. 1 is a perspective view of the new and improved protector arrangement constructed in accordance with the principles of the present invention and showing the new and improved protector package of the present invention in combination with an AT&T Style 110 telephone terminal block.

Referring now to the drawings, and more particularly to FIG. 1 thereof, there is shown the new and improved over-current or surge-current protector arrangement constructed in accordance with the principles of the present invention and generally indicated by the reference character 10. In particular, the protector arrangement 10 of the present invention contemplates the incorporation therein, or the intended use in conjunction with, a telephone terminal block 12, such as, for example, a block conventionally referred to as an AT&T Style 110 Block, which is commonly used in connection with telephone circuitry and other electronic applications or systems. The terminal block 12 comprises a plurality of longitudinally extending rows of terminals 14a, 14b, 14c, and 14d. Terminal rows 14a and 14b are laterally spaced with respect to each other so as to define an elongated or longitudinally extending channel 16 therebetween, and similarly, terminal rows 14c and 14d are laterally spaced with respect to each other so as to form an elongated or longitudinally extending channel 18 therebetween. Each one of the rows 14a–14d is provided with or comprises a plurality of longitudinally aligned terminals 20 or 20', and it is further seen that the terminals 20 disposed within the rows 14a and 14d are laterally aligned with corresponding terminals 20' disposed within terminal rows 14b and 14c, respectively. Therefore, each set of corresponding laterally opposed or aligned terminals 20 and 20' define a terminal pair or set, and it will be seen hereinbelow that the protector package of the present invention suitably interconnects sets or pairs of opposed terminals 20–20' disposed within the terminal rows 14a and 14b, or 14c and 14d.

Continuing further, the protector package of the present invention is generally indicated by the reference character 22 and is seen to comprise a plastic housing which is fabricated from a suitable plastic material, such as, for example, a fire-retardant polymer. The housing is comprised of two co-mating, interfitting front and back housing halves 24 and 26 which comprise identical parts and which are assembled together and subsequently sonically welded to each other. As can best be appreciated from FIGS. 2, 3, and 6, wherein only the rear housing half 26 is illustrated, each housing half is seen to comprise a lower terminal portion or section 28, a middle body portion or section 30, and an upper line test probe section or portion 32. More particularly, the lower terminal portion or section 28 of each housing half 24 ann 26 is adapted to have lower terminal or leg portions 64 of tip or, ring terminals or contacts 56 protrude or be accessible therefrom in order to be plugged into the terminal block 12 such that the terminals or contacts 56 of the housing 22 can be engaged with or connected to the terminals 20 and 20' of the terminal block 12. The middle body portion or section 30 of each housing half 24 and 26 is adapted to house central body portions 62 of the ring or tip terminals or contacts 56, as well as a pair of surge-current or over-current protector current-limiting devices 40. Lastly, the upper line test probe section or portion 32 of each housing half 24 and 26 is adapted to house line test probe terminal or contact portions 70a and 70b for mating, for example, with a suitable AT&T line test probe, not shown, by means of which the operability of the various lines or circuits of the terminal block 12 may be tested when protector package 22 is mounted upon the terminal block 12 and suitably interconnects a particular one of the lines or circuits of the block 12 as defined between aligned sets or pairs of terminals 20 and 20'.

Figure 6:
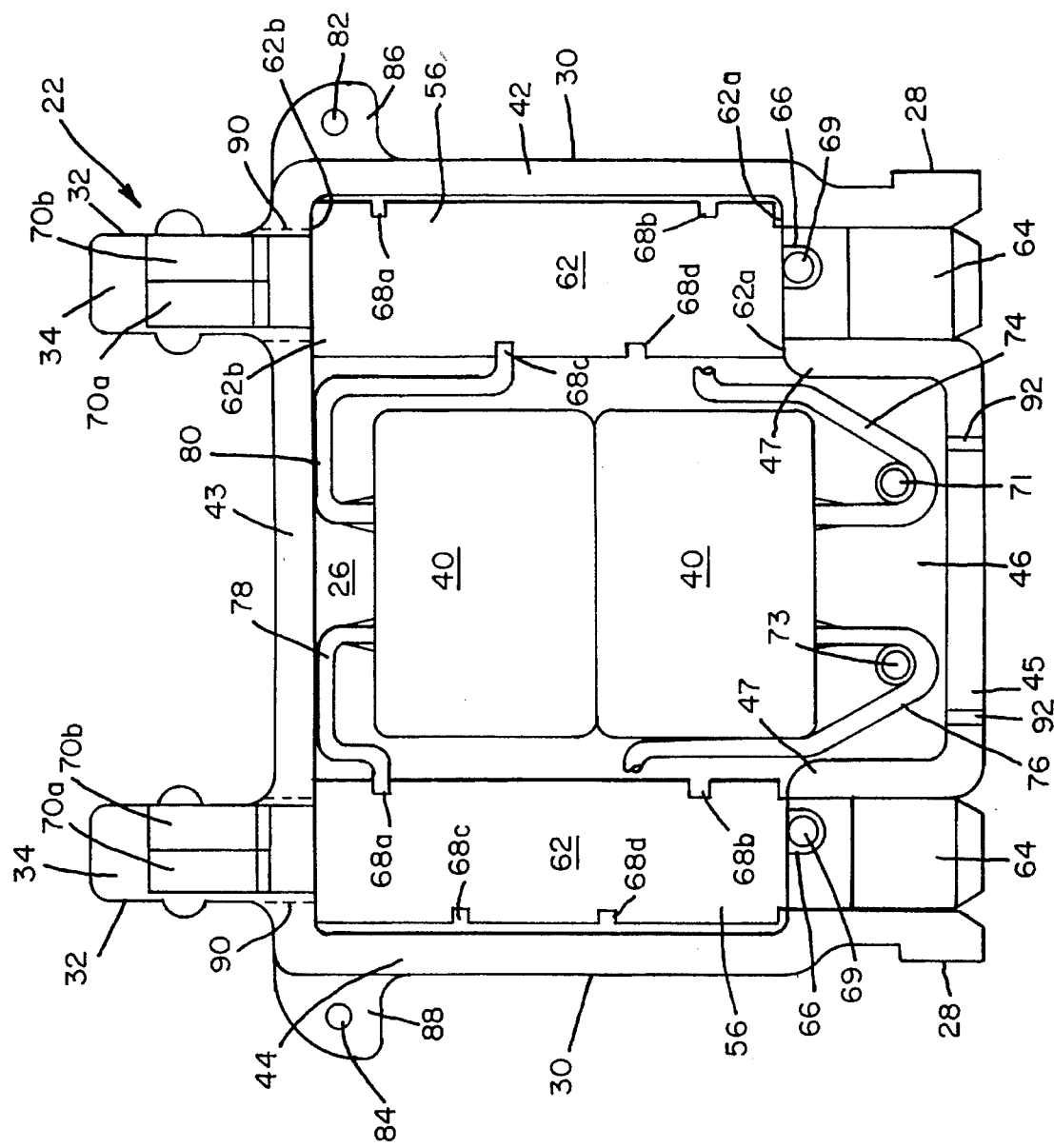
FIG. 6 is a front elevational view of the assembled protector package of the present invention, with the front housing half removed for clarity and illustrative purposes, showing the relative disposition of the over-current or surge-current protector devices and the tip or ring terminals or contacts of FIGS. 4 and 5 as incorporated within the rear housing half as illustrated in FIGS. 2 and 3.

Considering the housing more in detail, it is seen from FIGS. 2, 3, and 6 that each housing half 24 and 26, with housing half 26 being particularly illustrated, comprises confronting and interfitting sidewalls members 42 and 44, respectively, upper wall member 43, and lower wall member 45, the wall members 42–45 protruding forwardly from a rear wall member 46 whereby the wall members 42–46 define a cavity within which the tip or ring terminals or contacts 56, as well as the current limiting devices 40 are able to be housed. Narrow, upstanding wall members 34 and 36 are integrally formed with forward and backward edge portions of the upper wall member 43 of the housing half 26 so as to define a space 35 therebetween within which the line test probe terminal or contact portions 70a and 70b of the ring or tip terminals or contacts 56 are able to be disposed for providing the aforenoted accessibility for the line test probe, not shown. In a similar manner, laterally spaced side portions of the lower terminal portion or section 28 of each housing half 24 and 26 are provided with downwardly extending openings or cavities 104 within which or through which the lower terminal or leg portions 64 of the tip or ring terminals or contacts 56 are disposed or extend so as to render the same accessible with respect to the terminals 20 and 20' of the terminal block 12 such that the tip or ring contacts or terminals 64 may suitably engage the terminals 20 and 20' of the terminal block 12.

Figure 4:
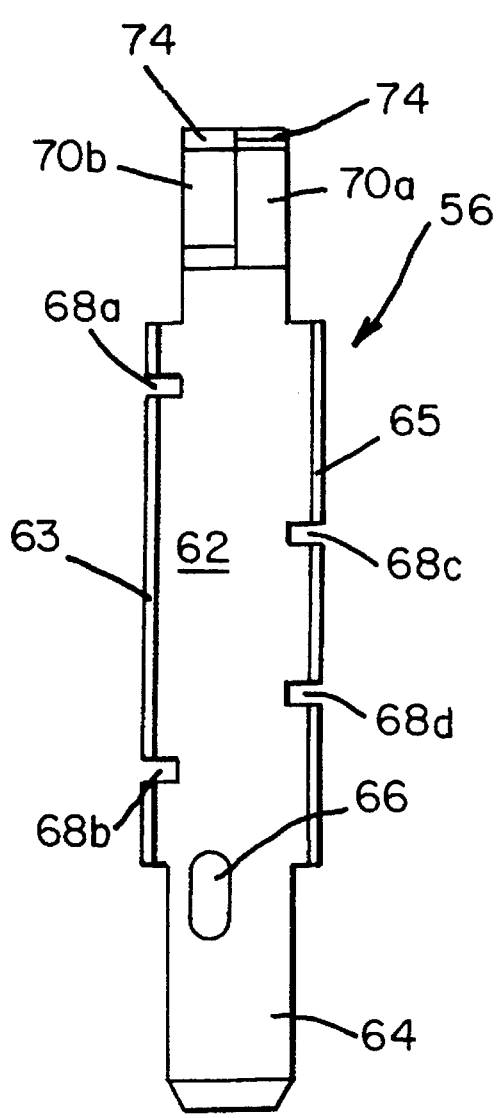
FIG. 4 is a front elevational view of one of the tip or ring terminals or contacts of the protector package of the present invention and adapted to be fixedly mounted within each housing half illustrated in FIGS. 2 and 3 for electrical connection with the terminals of the rows of terminals of the telephone terminal block as illustrated in FIG. 1.
Figure 5:
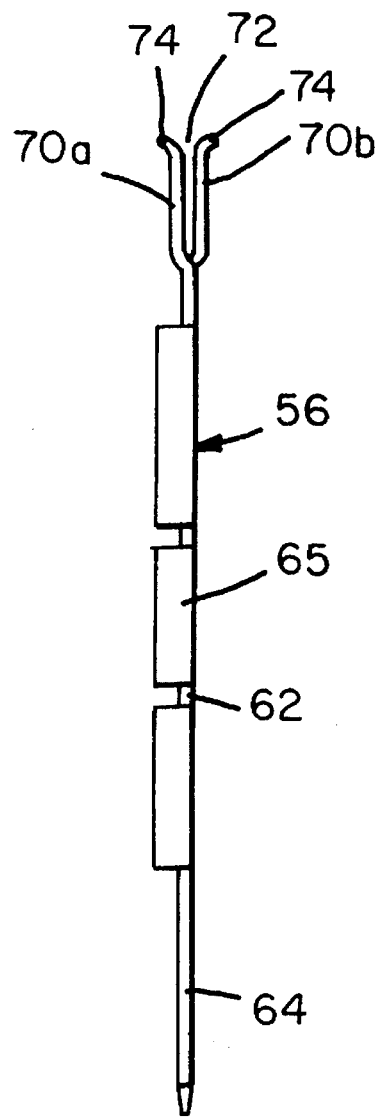
FIG. 5 is a side elevational view of the tip or ring terminal or contact of FIG. 4.

The tip or ring terminals or contacts 56 shown in FIGS. 4 and 5 are all identical with respect to each other, and they are shown in detail in FIGS. 4 and 5 and in assembled relationship with respect to the housing halves in FIG. 6. In particular, each one of the tip or ring terminals or contacts 56 is preferably formed from a suitable phosphor-bronze strip metal and is tin-plated for solderability. Still further, each one of the tip or ring contacts or terminals 56 comprises an integral sheet metal stamping comprising the flat central body portion 62 and the dependent leg portion 64. The latter portion or lower terminal section 64 is provided with an oval-shaped aperture 66, and the central body portion 62 is provided with forwardly projecting sidewall members 63 and 65. In order to electrically connect the protector or current-limiting devices 40 to the various tip or ring contacts 56 disposed within the housing halves 24 and 26, the sidewall member 63 of the central body portion 62 of each contact 56 is provided with a pair of vertically spaced slots 68a and 68b, and similarly, the sidewall member 65 of the body portion 62 is provided with a pair of vertically spaced slots 68c and 68d, the spacing defined between the slots 68a and 68b being greater than the spacing defined between the slots 68c and 68d. The test probe terminal or contact portions 70a and 70b of each tip or ring contact 56 are integrally formed with the uppermost end portion of each contact 56, and it is seen from FIG. 5 that the test probe terminals or contacts 70a and 70b are offset with respect to each other so as to, in effect, be disposed upon opposite sides of the plane defining the central body portion 62 of each contact 56 and thereby define therebetween an opening, slot or space 72 for facilitating mating with the complimentary structure of the test probe. The outermost or distal tip portions 74 of the offset terminals or contacts 70a and 70b is outwardly deflected or flared so as to serve as a lead-in or guide for the test probe structure and thereby facilitate the mating of such structure with the terminals or contacts 70a and 70b.

As noted hereinabove, the protector package 22 of the present invention, comprising the housing halves 24 and 26, is adapted to house therein a pair of surge-current or over-current protector or current-limiting devices, such as, for example, positive-temperature coefficient (PTC) devices 40. Such PTC devices 40 are well known per se in the art and are quite superior to either fuses or circuit-breakers. Unlike fuses, such protection devices 40 need not be replaced after the occurrence of a fault, and unlike circuit breakers, such protection devices 40 need not be manually reset. Nevertheless, as is well-known, such PTC devices can be used like fuses because their resistance increases exponentially above some critical temperature. The PTC devices 40 can be fabricated from any suitable material, but conductive polymers, such as, for example, those Composed of crystalline polyolefin or fluoropolymer matrices in which carbon-black or other conductive particles are dispersed, are preferred. Resistivity is determined by means of the type of conductive particles employed as well as the volume ratio of the conductive particles to the polymer. At normal temperatures, the conductive particles form chains in the polymer. Small variations in the conductive particles-to-polymer volume ratio, however, produce large differences in resistivity. More particularly, the volume of crystalline polymer used in the PTC devices changes abruptly at temperatures near the polymer melting point. As the temperature of the devices rises and passes the melting point, the polymer volume increases thereby decreasing the conductive-particles-to-polymer volume ratio. The change in polymer volume interrupts many of the conductive chains thereby increasing resistance several-fold, and thereby limiting the current to safe levels as long as, for example, the power fault persists. Once the circuit's power is removed, the current level is zero, the conductive polymer's internal temperature begins to drop, and the polymer's structure reverts to its original crystalline state, re-establishing the conductive chains and lowering the internal resistance whereby the device returns to its original operative state.

Referring again to FIGS. 2, 3, and 6, each housing half 24 and 26, with housing half 26 actually being illustrated, is provided with a pair of inwardly projecting, laterally spaced dowels 69 within the lower terminal portion or section 28 for insertion through the oval-shaped apertures 66 of the tip or ring terminals or contacts 56 whereby the latter terminals or contacts 56 are fixedly positioned within each housing half 24 and 26. It is further seen that the lower wall member 45 of each housing half 24 and 26 includes a pair of vertically raised, laterally spaced sections 47 through which the aforenoted openings or cavities 104 are defined for receiving the lower terminal or leg portions 64 of the tip or ring contacts or terminals 56, and lower shoulder portions 62a of central body portions 62 of the contacts or terminals 56 are seated upon the sections 47. In a similar manner, upper shoulder portions 62b of the body portions 62 are seated upon laterally spaced portions of the upper wall member 43 of each housing half 24 and 26, and in this manner, the tip or ring contacts or terminals 56 are firmly seated within each housing half 24 and 26. Male dowels 71, and female dowels 73, that is, dowels having recessed outermost portions for receiving the male dowels, are integrally provided within lower central portions of each housing half 24 and 26 for facilitating mating of the housing halves 24 and 26 as well as serving as routing means about which conductor wires 74 and 76 of the lower protector device 40 are disposed. The upper protector device 40 also has conductor wires 78 and 80 extending outwardly therefrom, and it is seen that wires 78 and 80 are respectively connected to slots 68a and 68c of the two tip or ring terminals or contacts 56 disposed within the housing half 26 along with the upper protector device. The lower protector device 40, which is illustrated in FIG. 6, and the other two tip or ring contacts 56 which are not illustrated within FIG. 6, are mounted within the other housing half 24, with conductor wire 74 adapted to be connected to slot 68b of its associated tip or ring contact 56, not shown, while conductor wire 76 is adapted to be connected to slot 68d of its associated tip or ring contact or terminal 56, also not shown. An additional male dowel 82 and female recess 84 are also provided upon ear members 86 and 88 integrally formed upon the uppermost portions of the housing sidewall members 42 and 44, respectively, of each housing half 24 and 26 for facilitating mating of the housing halves 24 and 26 prior to the sonic welding together of the housing halves 24 and 26.

With reference being made particularly to FIG. 6, it can be appreciated that the protector package 22 of the present invention is seen to comprise the two housing halves 24 and 26 with each housing half 24 and 26 having disposed therein one of the PTC protector devices 40 and a pair of tip or ring terminals or contacts 56 connected thereto. Consequently, when the housing halves 24 and 26 are assembled together, the package 22 comprises the two PTC protector devices 40 disposed within the central portion of the composite housing and four tip or ring terminals or contacts 56 disposed within laterally spaced portions of the composite housing. Once so assembled, the housing halves 24 and 26 may be sonically welded together by means of a suitable sonic welding process. It is further noted that in order for the tip or ring terminals or contacts 56 to be accommodated within the housing halves 24 and 26 as illustrated, and more specifically, in order to accommodate the line test probe terminal or contact portions 70a and 70b of such terminals or contacts 56, the upper wall member 43 of each housing half 24 and 26 is provided with apertures for passage of the line test probe terminal or contact portions 70a and 70b therethrough. In view of the fact that the PTC current limiting devices 40 are also ambient temperature sensitive in addition to being sensitive to temperatures generated by means of the current and resistivity characteristic of the lines or circuits within which the PTC current limiting devices 40 are employed, the apertures 90 of each housing half 24 and 26 also serve to vent the interior portion of the protector package housing as defined by means of the housing halves 24 and 26. In a similar manner, the lower wall member 45 of each housing half 24 and 26 is likewise provided with laterally spaced apertures 92 for additional venting of the interior portion of the protector package housing comprising housing halves 24 and 26.

From the foregoing detailed description, it can thus be seen that the present invention provides a new and improved surge-current or over-current protector package for use with a telephone terminal block having at least two rows of terminals which are spaced apart with respect to each other so as to form an elongated channel therebetween, and wherein the protector package includes pairs of laterally spaced tip or ring terminals or contacts which are adapted to interface with oppositely disposed terminals of the telephone block which are disposed within the aforenoted rows of terminals. The protector package includes positive-temperature-coefficient current limiting devices operatively connected to the tip or ring terminals or contacts, and the positive-temperature-coefficient (PTC) current-limiting devices and tip or ring terminals or contacts are disposed within a two-piece housing comprising inter-fitting or co-mating housing halves wherein a pair of the tip or ring terminals or contacts and one of the positive-temperature-coefficient current-limiting devices are disposed within each housing half.

In light of the foregoing teachings, many modifications and variations of the present invention are possible in connection with the present invention despite the illustration and description of a particular embodiment thereof. It is therefore to be understood that within the scope of the appended claims, the present invention may be practiced otherwise than as specifically described herein-above.

What is claimed as new and desired to be protected by means of Letters Patent of the United States of America, is:

1. A surge-current or over-current protector package, comprising:

a housing;

a plurality of electrical contacts disposed internally within said housing for connection to an electrical circuit external of said housing; and a plurality of current-limiting means disposed internally within said housing and operatively connected to said plurality of electrical contacts for limiting the amount of current within said electrical circuit so as to protect said circuit and a load connected to said circuit against surge-current or over-current conditions, wherein said housing comprises co-mating housing halves with one half of said plurality of electrical contacts and one half of said plurality current-limiting means disposed within each one of said housing halves, and wherein further, each one of said housing halves accommodates half of said plurality electrical contacts and all of said plurality of current-limiting means when said co-mating housing halves are assembled together so as to form said housing.

2. A protector package as set forth in claim 1, wherein:

said plurality of electrical contacts comprises four electrical contacts; and plurality current-limiting means comprises a pair of current-limiting devices with each one of said current-limiting devices connected between a pair of said four electrical contacts.

3. A protector package as set forth in claim 1, wherein:

said plurality of current-limiting means comprises a positive-temperature coefficient (PTC) devices.

4. A protector package as set forth in claim 2, wherein:

said pair of current-limiting device comprises a pair of positive-temperature-coefficient (PTC) devices.

5. A protector package as set forth in claim 2, wherein:

two of said four electrical contacts and one of said pair of current-limiting devices are disposed within each one of said housing halves.

6. A protector package as set forth in claim 5, wherein:

said two of said four electrical contacts disposed within each one of said housing halves have externally accessible terminal sections projecting outwardly from laterally spaced lower corner portions of said each one of said housing halves for mating with laterally spaced opposed terminals disposed within longitudinally extending rows of terminals provided upon a telephone terminal block.

7. A protector package as set forth in claim 6, wherein:

said two of said four electrical contacts disposed within each one of said housing halves have externally accessible terminal portions projecting outwardly from laterally spaced upper corner portions of said each one of said housing halves for mating with a line test probe for testing the operability of circuit lines of said telephone terminal block when said protector package is mounted upon said telephone terminal block and interconnects a particular set of said laterally spaced opposed terminals of said telephone terminal block which define a particular circuit line.

8. A protector package as set forth in claim 5, wherein:

each one of said co-mating housing halves comprises a rear wall member, and upper, lower, and sidewall members projecting forwardly from said rear wall member so as to define a recessed cavity within which said two electrical contacts and said one of said current-limiting devices are housed.

9. A protector package as set forth in claim 3, further comprising:

venting means defined within said housing for ventilating the interior of said housing to the exterior of said housing so as to dissipate heat from said interior of said housing as may be generated by said positive-temperature-coefficient (PTC) devices.

10. A protector package as set forth in claim 3, wherein:

said positive-temperature-coefficient (PTC) devices comprise a conductive polymer type PTC devices.

11. In combination, a surge-current or over-current protector package, and a telephone terminal block, comprising:

a telephone terminal block having at least two rows of terminals which are laterally spaced apart with respect to each other;

a housing;

a plurality of electrical contacts disposed internally within said housing for electrical connection to a plurality of terminals of said telephone terminal block; and a plurality of current-limiting means disposed internally within said housing and operatively connected to said plurality of electrical contacts disposed within said housing for limiting the amount of current within an electrical circuit comprising said plurality of terminals of said telephone terminal block so as to protect said circuit against surge-current or over-current conditions, wherein said housing comprises co-mating housing halves with one half of said plurality of electrical contacts and one half of said plurality of current-limiting means disposed within each one of said housing halves, and wherein further, each one of said housing halves accommodates half of said plurality of electrical contacts and all of said plurality of current-limiting means when said co-mating housing halves are assembled together so as to form said housing.

12. The combination as set forth in claim 11, wherein:

said plurality of electrical contacts disposed within said housing comprises four electrical contacts; and plurality of current-limiting means comprises a pair of current-limiting devices with each one of said pair of current-limiting devices connected between a pair of said four electrical contacts.

13. The combination as set forth in claim 11, wherein:

plurality of current-limiting means comprise a positive-temperature coefficient (PTC) devices.

14. The combination as set forth in claim 12, wherein:

said pair of current-limiting devices comprises a pair of positive-temperature-coefficient (PTC) devices.

15. The combination as set forth in claim 12, wherein:

two of said four electrical contacts and one of said pair of current-limiting devices are disposed within each one of said housing halves.

16. The combination as set forth in claim 15, wherein:

said two of said four electrical contacts disposed within each one of said housing halves have externally accessible terminal sections projecting outwardly from laterally spaced lower corner portions of said each one of said housing halves for mating with laterally spaced terminals disposed within said rows of laterally spaced terminals of said telephone terminal block.

17. The combination as set forth in claim 16, wherein:

said two of said four electrical contacts disposed within each one of said housing halves have externally accessible terminal portions projecting outwardly from laterally spaced upper corner portions of said each one of said housing halves for mating with a line test probe for testing the operability of circuit lines of said telephone terminal block when said housing is mounted upon said telephone terminal block so as to interconnect a particular set of said laterally spaced terminals of said telephone terminal block which define a particular circuit line.

18. The combination as set forth in claim 15, wherein:

each one of said co-mating housing halves comprises a rear wall member, and upper, lower, and sidewall members projecting forwardly from said rear wall member so as to define a recessed cavity within which said two electrical contacts and said one of said current-limiting devices are housed.

19. The combination as set forth in claim 13, further comprising:

venting means defined within said housing for ventilating the interior of said housing to the exterior of said housing so as to dissipate heat from said interior of said housing as may be generated by said positive-temperature-coefficient (PTC) devices.

20. The combination as set forth in claim 13, wherein:

said positive-temperature-coefficient (PTC) devices comprise a conductive polymer type PTC devices.

* * * * *